Figure 1:
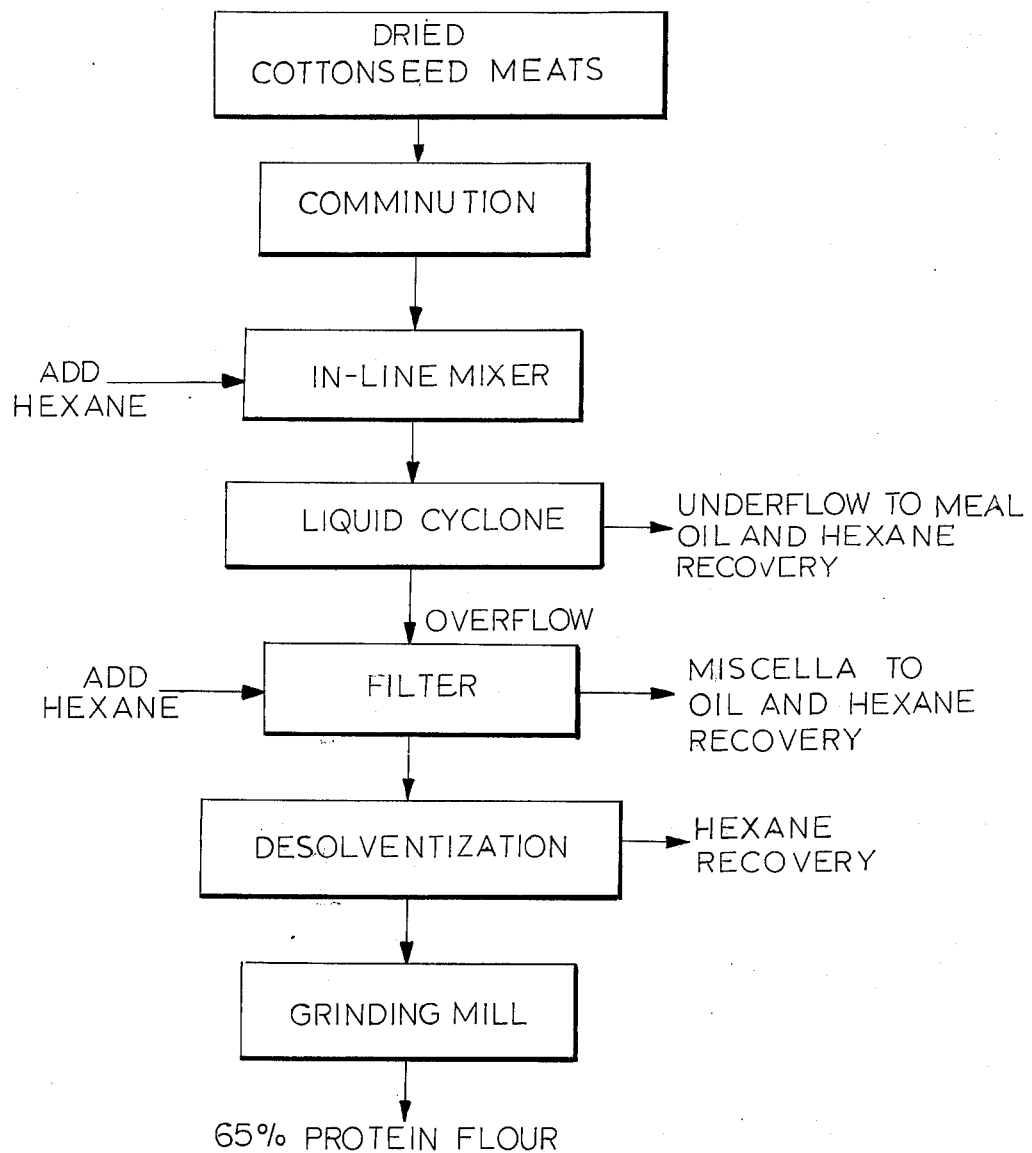

United States Patent [19]

Gardner, Jr. et al.

[11] 3,972,861

[45] Aug. 3, 1976

[54] PROCESS FOR PRODUCING AN EDIBLE COTTONSEED PROTEIN CONCENTRATE

[75] Inventors: Homer K. Gardner, Jr., Metairie; Robert J. Hron, Sr., New Orleans; Henry L. E. Vix, Metairie, all of La.; Jim M. Ridlehuber, Lubbock, Tex.

[73] Assignee: The United States of America as represented by the Secretary of Agriculture, Washington, D.C.

[22] Filed: Nov. 26, 1974

[21] Appl. No.: 527,398

[52] U.S. Cl.............................. 260/123.5; 426/430; 426/656
[51] Int. Cl.² ........................................... A23J 1/14
[58] Field of Search .................................. 260/123.5

[56] References Cited
UNITED STATES PATENTS

| 2,594,117 | 4/1952 | Bonotto ....................... 260/123.5 X |
| 3,579,496 | 5/1971 | Martinez et al .................. 260/123.5 |
| 3,615,657 | 10/1971 | Gastrock et al ........... 260/123.5 UX |
| 3,814,748 | 6/1974 | Olson et al ....................... 260/123.5 |

OTHER PUBLICATIONS

Chem. Abstracts, vol. 76, 1972, 12865t, Vix et al.
J. Am. Oil Chemists Soc., vol. 48, 1971, pp. 611–615, Vix et al.

*Primary Examiner*—Howard E. Schain
*Attorney, Agent, or Firm*—M. Howard Silverstein; Salvador J. Cangemi; David G. McConnell

[57] ABSTRACT

An edible high-protein flour is produced by an improved process. Cottonseed meats are dried, and then comminuted in a wide chamber mill having certain specifications which prevent rupturing the pigment glands of the cottonseed. This improvement is correlated with liquid cyclone separation followed by solids recovery steps, thus comprising an improved process which consistently yields an edible cottonseed protein concentrate.

6 Claims, 2 Drawing Figures

PROCESS FOR PRODUCING AN EDIBLE COTTONSEED PROTEIN CONCENTRATE

This invention relates to an industrially practical, continuous method of processing cottonseed to produce as a major end product an edible grade of cottonseed concentrate that is high in protein content and essentially free of gossypol, oil, and hulls. The said end product is eminently suited for use as a high protein dietary supplement for human nutrition, and is of a quality and purity, with respect to its protein content, that have not hitherto been possible of attainment by contemporary processing methods.

BACKGROUND AND PRIOR ART

Cottonseed is unique among oilseeds in that distributed throughout the oil and protein bearing kernel are numerous small ovoid sacs, commonly known as pigment glands. These pigment glands contain about 35 to 45 percent by weight of gossypol and gossypol like compounds.

By chemical analysis whole mill run cottonseed, with linters removed, contain up to about 1.5 percent of gossypol. Since the hulls contain little or no gossypol, the gossypol content of dehulled kernels is higher. If the protein content, only, of the cottonseed kernels is considered, its content of gossypol may be as high as 3 percent. This is an important consideration because as the protein content of any cottonseed product is increased by the removal of hulls, oil and other nonprotein constituents, the gossypol content will rise proportionally unless concurrent steps are taken to remove gossypol.

Gossypol is a high reactive material, and under the processing conditions normally used including, but not limited to, moisture, heat, pressure and time, the pigment glands of cottonseed are ruptured, the gossypol is discharged and some or most of it combines with various constituents of the meal. The most usual combination appears to be with lysine, one of the essential amino acids present in cottonseed. When combined with gossypol, this essential amino acid is rendered nutritionally unavailable. Two methods of gossypol analysis are presently in use and these methods permit the determination of gossypol with a high degree of accuracy. One method determines the "free" or uncombined gossypol present. The other method determines the "total" gossypol content. The differnece between the two values is referred to as the "bound" gossypol.

Cottonseed pigment glands normally are mechanically strong and resistant to rupture; however, in the presence of moisture, and particularly moisture in combination with heat and pressure, pigment glands readily rupture and discharge their gossypol content which material is thereby brought into intimate contact with the protein, oil, and other constituents making up the kernel.

Currently, cottonseed is processed by mechanical pressing (screw pressing or hydraulic pressing), by solvent extraction with a commercial grade of n-hexane, or by prepress solvent extraction in which a major part of the oil is first removed by screw-pressing followed by solvent extraction of the resulting press cake with commercial n-hexane. The meal or cake produced by any of these processes is typically adjusted to contain 41 percent protein (nitrogen × 6.25) by incorporation of cottonseed hulls that contain little or no protein. Some few commercial cottonseed crushing mills produce a meal with about 50 percent protein. The cake or meals just described (41 to 50 percent protein) are destined for use as animal feed. Processing conditions vary considerably in the different mills and can affect, in a significant manner, sometimes adversely, the quality and nutritive value of the cottonseed meal being produced, especially if use as a feed for nonruminants is intended.

The preparation and processing conditions employed in the aforementioned methods all employ in some degree the addition of moisture to either the kernels or the flaked meats, together with heating or cooking and the application of pressure where screw pressing, prepressing, or hydraulic pressing steps are employed. These conditions of processing are in general ideally suited to rupture the pigment glands, liberate the gossypol contained therein into intimate contact with the other kernel components, and promote the reaction of gossypol with the protein constituents of the kernel.

The presence of cottonseed pigments together with attendant processing conditions often cause the crude cottonseed oil produced conventionally to have a color so dark that the normal alkali refining and bleaching will not yield an oil prime in color. Such colored oils must be sold under a price penalty.

There is a limited commercial production of a cottonseed flour intended for human consumption. This is by careful selection of prime whole cottonseed kernels low in gossypol content from an adjacent production line (producing oil and feel grade meals), by the elimination of as many hulls as possible, by diversion of broken and fine kernel fractions (containing much hull material) back to the adjacent production line, and by careful screw pressing of the selected kernels, followed by fine grinding. By such processing, flour product is produced which is higher in quality than the conventional feed grade meal collaterally produced. The flour product is nevertheless much higher in gossypol content, much lower in protein quality, and is much darker than the cottonseed flour produced by this invention.

THE PROCESS OF THE PRESENT INVENTION

The process of this invention produces a high-grade protein concentrate, the quality of which is in evidence by its representative analysis as follows:

| Composition | |
| --- | --- |
| Moisture, % | 3.66 |
| Protein (Nitrogen × 6.25) MFB% | 68.40 |
| Nitrogen, % | 10.54 |
| Nitrogen solubility (in .02 N NaOH) % | 99.49 |
| Total gossypol, % | 0.12 |
| Free gossypol, % | 0.03 |
| Lipids, % | 0.62 |
| Crude fiber, % | 2.4 |
| Ash, % | 7.54 |
| E.A.F. Lysine (g./16 g N) | 3.94 |
| Residual hexane (ppm) | 35 |

The above-listed compositional analyses are possible of achievement by reason of new discoveries that relate to the handling, preparation, and drying of the cottonseed kernels; by the discovery of new continuous techniques in the application of equipment for selective comminution of the cottonseed kernels whereby the pigment glands are freed essentially intact from their enrobing tissue, and the protein meal particles are finely comminuted without rupturing the pigment glands; by the discovery of a highly efficient, rapid and continuous solvent process using a 3 inch diameter liquid cyclone whereby a concentrated pigment gland fraction for diversion from the process is instantly obtained as an underflow from a 3 inch liquid cyclone, the overflow obtained from the 3 inch liquid cyclone being employed directly to produce a product of 65 percent or higher protein content and at a yield of 46 percent or higher based on the total solids fed to the cyclone; by the discovery of a highly efficient continuous process whereby the coarse meal underflow fraction fron one 3 inch liquid cyclone can be reprocessed through a second 3 inch liquid cyclone to recover or scalp entrained high-protein fines and thus increase final yield of high-protein product from 46 to 50 percent or more of the total new solids fed to the liquid cyclone; by the discovery that the use of totally hull-free kernels results in a yield increase of high-protein product of 2 percent or more in either the use of a single 3 inch liquid cyclone or two 3-inch liquid cyclones in series.

We have found that a meats stream from cottonseed hulling equipment composed of the kernels (whole meats) and some cracked meats, and contaning 3 percent or less of hulls can be used. The hulls are removed in the underflow fraction produced in the subsequent liquid cyclone operations.

We have discovered that when comminuting either undefatted, partially defatted, or defatted material to prevent or minimize the concurrent rupture of pigment glands it is essential first to dry the cottonseed kernel meats to 2.5 percent by weight or lower moisture.

The next step is one of the most critical in the process. With insufficient size reduction the yield of high-protein flour will be low; with excessive communition the pigment glands will be ruptured or overly fragmented reducing the efficiency of the cyclone to separate them from the product flour. A sieveless, wide-chamber pin mill was found to be acceptable in the comminution step. The selected mill has two contra-rotating discs with rings of intermeshing round pins. The discs operate separately from the mill side and from the door.

We have discovered that the proper degree of disintegration, without gland rupture, can be accomplished if the mill side pin disc is operated at 9,500 RPM and the door side pin disc at 2,500 RPM. It is essential that the meats be dried to 2.5 percent or less in moisture content, but they may be unextracted, partially extracted, or extracted prior to the comminution step.

The milled meats are next fed to an in-line mixer where they are slurried with metered solvent or in the case of a double cyclone operation, the scalped overflow fraction from the second cyclone. The resulting slurry is at a consistency of between 17 and 25 percent total solids.

The slurry feed is pumped at a pressure of about 40 pounds per square inch into the tangential feed port of the liquid cyclone at its largest diameter. The resulting centrifugal action whirls the feed stream around the periphery of the interior of the cyclone and exerts a centrifugal force of approximately 5000 times the force of gravity, depending on the pressure and rate of feed of the slurry material. This centrifugal action causes the larger, heavier, and more compact particles having the lowest ratio of surface area to mass (as typified by the ovoid-shaped pigment glands and the larger particles of meats tissue) to travel rapidly to the peripheral wall of the liquid cyclone. These particles which include essentially all of the pigment glands, the larger meats particles, and hull particles, are forced by the moving liquid down the tapered sides of the cyclone to the lower construction tip or "apex" where they are discharged, together with a minor portion of the solvent, as underflow. The finer meal particles or flour, which are essentially free of pigment glands and are of lower effective specific gravity than the pigment glands and coarse meal particles due to their relatively high ratio of surface area to mass, move much more slowly towards the peripheral wall of the liquid cyclone and are forced upwards by the moving liquid through the vortex finder at the center of the cyclone and are discharged through the vortex finder at the top as overflow.

We have found that the underflow stream ranges in solids content from about 30 to about 45 percent by weight while the overflow stream ranges in solids content from about 10 to about 15 percent by weight, with the overflow stream amounting to from about 50 to about 90 percent and higher by weight of the feed stream, while the underflow stream amounts to from about 10 to about 50 percent of the weight of the feed stream. We have also found that the ratio by weight of the overflow stream to that of the underflow stream and the solids content of the respective streams is controlled by the rate and pressure at which the feed stream enters the tangential feed port of the liquid cyclone, the cross-sectional area of the apex orifice through which the underflow discharges, the makeup of the solids of the feed stream with respect to particle size, and the solids content of the feed stream. The larger, and more compact particles of the slurry which include the bulk of the pigment glands, are forced by the moving liquid down the tapered sides of the apex, or small lower end where they are discharged as underflow (UF). The finer meal particles, practically free of pigment glands, are forced to the center of the cyclone and are discharged upward through the vortex finder as the overflow (OF). The cyclone split or weight ratio of OF to UF is controlled by adjusting the speed of a positive displacement UF slurry pump which is located at the apex or UF opening of the cyclone. The "split" may also be controlled by varying the apex orifice. The split ratio is normally from approximately 1 to 1 to approximately 9 to 1. Under certain conditions smaller or larger splits may be desirable.

Liquid cyclones are available in many sizes, usually designated by the maximum inside diameter of the cylindrical portion, expressed in inches (in.). The cyclone used in this invention is a 3 inch cyclone. This invention is not limited to the use of this size cyclone because other liquid cyclones, larger and smaller can be used.

It should be noted that the capacity of the system may be greatly expanded by the use of multiple liquid cyclones in parallel.

Overall yield of high-protein flour can be enhanced by reclaiming fines entrained in the UF from the first liquid cyclone. This is accomplished by reslurrying the UF with fresh solvent and sending this slurry through a second 3 inch liquid cyclone. The resulting OF from the second liquid cyclone may then be substituted for fresh solvent in the initial slurrying of milled cottonseed meats in the fluidizer thus increasing overall yield of high-protein meal by approximately 4 to 6 percent.

The OF from the first liquid cyclone, having a solids content of about 14 percent is suitable as feed to a continuous vacuum drum filter. Filter runs on a small vacuum drum filter have yielded a rate of above 3.5 pounds of solids per square foot of filter area per hour. During filtration it was observed that the filter cake had a tendency to crack which resulted in ineffective lipid removal. It was discovered that this problem could be solved by use of a feed slurry wash of the cake as it emerged from the slurry tank.

SALIENT FEATURES OF THE INVENTION

The salient features of the instant process are applicable to defatted, partially defatted, or undefatted cottonseed, glanded or glandless cottonseed, being prime in quality and free of deleterious contaminants as a starting material. The features comprise (1) rigorous control of moisture in the starting material (meats essentially free of hulls) at moisture levels well below those previously used in conventional oilseed milling practice; (2) precisely controlled, practically instantaneous dry comminution of the material being processed while maintaining the integrity of the gland structure to avoid dispersal of the gland contents in the processed material; (3) disintegration of the material by the use of a high-speed pim mill; and (4) the use of liquid cyclone to separate the glanded from the unglanded portion, either singularly or in series.

Two Embodiments

Figure 2:
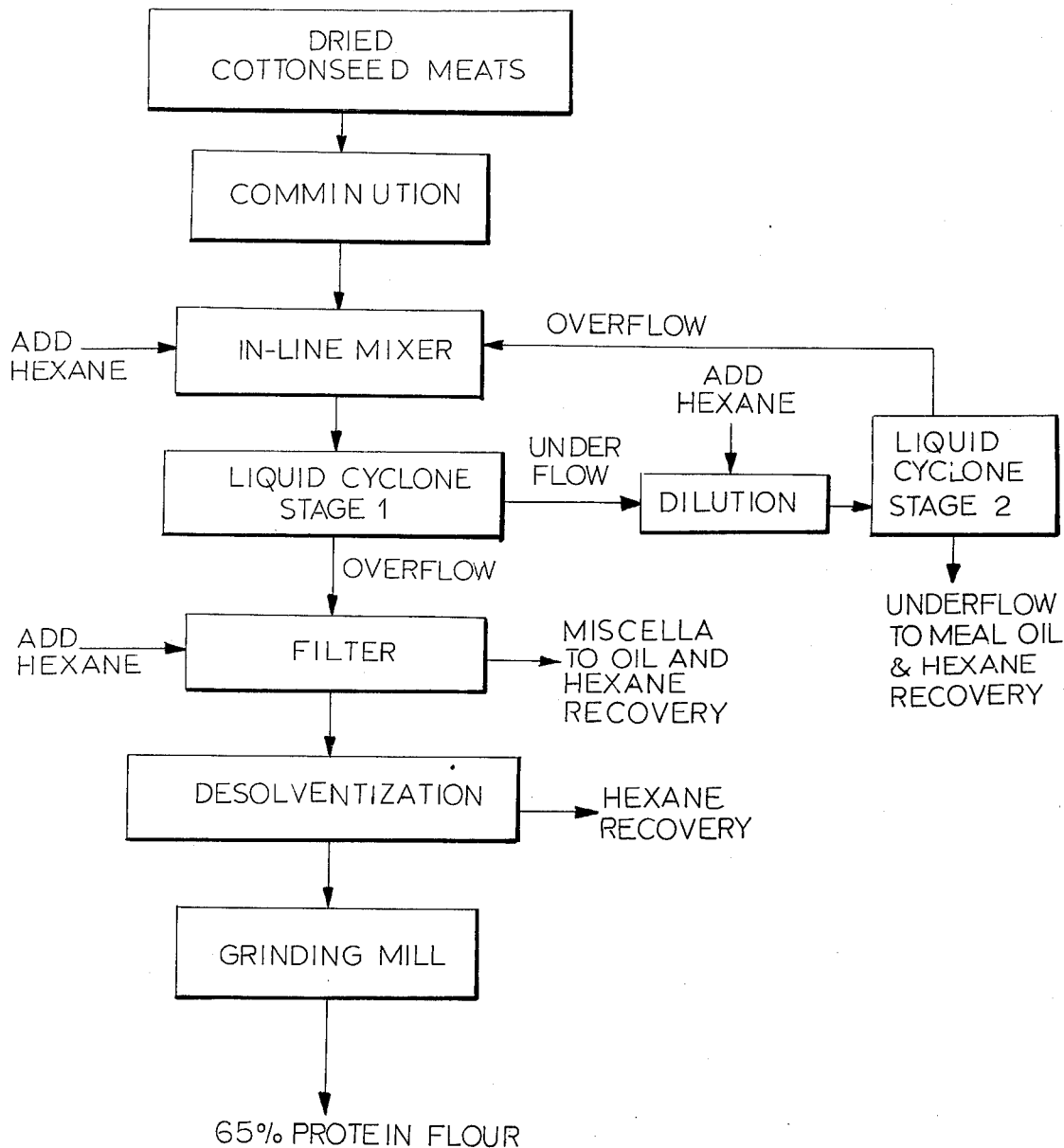

A more detailed description of the various steps of the process of the instant invention is provided. The steps are more easily related one to the other by recourse to flow diagrams (see FIGS. 1 and 2).

The process of the instant invention comprises two embodiments. A first embodiment wherein the cottonseed meats (kernels) are dried, comminuted, slurried with hexane and fractionated into a protein concentrate. This yields a concentrate that exhibits a protein content of 65 percent or more, by weight, at an overall recovery of 46 percent, by weight, of initial solids fed to the liquid cyclone (see FIG. 1).

A second embodiment parallels the several steps of the first embodiment but incorporates an additional step of reslurrying the underflow from the first cyclone with fresh hexane and then reclassifying for the purpose of exalting the overall recovery of protein concentrate product to at least 50 percent, by weight, of the initial fresh solids fed to the liquid cyclone.

Drying of Meats (Both Embodiments)

Meats are dryed preferably to 1.5 – 2.5 percent moisture content at a temperature not exceeding 180°F. Drying meats prior to extraction prevents the increase in moisture of meats tissue resulting from removal of oil, i.e., meats at 8 percent initial moisture and 33.3 percent oil, when extracted "as is," would yield oil free marc having a moisture content of about 12 percent. At this high level of moisture, pigment glands are weakened and ruptured simply by transfer of moisture to the gland walls. If the same meats are dryed to a moisture content of about 2 percent before extraction the moisture content of the oil-free marc (on a solids basis) produced is only about 3.0 percent, a concentration insufficient to affect the pigment glands.

It also appears that drying the meats tends to toughen the pigment glands, loosen the attachment of the pigment glands to the enrobing meats tissue, and make the proteinaceous material more friable during disintegration.

Comminution of Meats (Both Embodiments)

Comminution of the meats into ultrafine particles of meats tissue and intact pigment glands, most of which are entirely free of adhering meats particles, without rupturing the glands, is accomplished by feeding the meats through a sieveless, wide-chamber pin mill. This mill has two contra-rotating discs about 11 inches in diameter with 3 rings of intermeshing pins of about ¼ inch diameter. The discs operate separately from the mill side and from the door at the rates of 9,500 and 2,500 r.p.m., respectively. A vibratory feeder feeds meats into the mill where they are allowed to fall freely between the intermeshing pins whereupon they are disintegrated by impact. The grinding discs are suitably profiled so as to prevent the free passage of disintegrated meats at the pins' ends. The finely comminuted meats leaving the pin discs have a pronounced tendency to stick to the sides of a normal mill. This sticking and subsequent build-up pressure would result in both pigment gland and premature oil cell rupture producing a cottonseed butter. Such a condition results in the mill quickly clogging up and becoming inoperative. Once a majority of pigment glands are ruptured they cannot be separated in a hexane, liquid cyclone process. To prevent this from occuring the housing of the mill used in this process is of a wide-chamber construction, about 46 inches in diameter, which reduces the velocity of the particles in their travel to the housing walls preventing any significant build-up of finely disintegrated meats with inherrent pigment gland rupture. Although the use of meats containing 1 percent or less hulls are preferred, the liquid cyclone can separate up to 3 percent hulls from disintegrated meats, but this larger hull percentage requires additional power for disintegration and more importantly, results in both increased gland rupture and lower protein concentrate recoveries.

In-Line Mixing: Adding Hexane (Both Embodiments)

In-line mixing is used to obtain uniform wetting of the comminuted meats by hexane and also to initiate oil extraction which results in further disintegration of meats tissue.

In-line mixing is accomplished by feeding comminuted meats and metered hexane to a pug type, baffled mixer which provides vigorous nonimpact agitation. Initially hexane is metered to the in-line mixer at a sufficient rate to produce a slurry containing 17 to 25 percent solids by weight. When "on stream" conditions are attained the overflow from the second liquid cyclone may be returned to the in-line mixer to provide the solvent for dilution and the metered hexane feed is correspondingly stopped.

The uniformly mixed slurry is discharged directly from the in-line mixer into the liquid cyclone feed tank which is provided with an agitator.

Classification by Liquid Cycline (Both Embodiments)

The diluted slurry in the cyclone feed tank is maintained under vigorous agitation to keep all solids in uniform suspension and is fed to the 3 inch diameter liquid cyclone at 35–45 p.s.i. pressure by a pump. Classification and separation of the suspended particles in the slurry takes place in the liquid cyclone to deliver an underflow and an overflow stream. The underflow discharges the lower tip, or apex of the liquid cyclone. The underflow amounts to between 10 and 50 percent of the total slurry entering the feed aperature of the liquid cyclone and contains from about 30 to 45 percent of solids. The overflow discharges from the upper, or the vortex finder outlet of the cyclone. This overflow stream amounts to about 50 to about 90 percent of the total slurry entering the feed aperture of the cyclone and contains from about 10 to 15 percent of solids. The weight ratio of overflow to underflow is defined as the split and preferably ranges between from 1 part of overflow to 1 part of underflow to 9 parts of overflow to 1 part of underflow.

The split ratio is controlled primarily by adjusting the speed of a positive displacement underflow slurry pump which is located at the apex opening of the cyclone. The solids contents of the overflow and underflow streams are also controlled by the split ratio but are also affected by the percentage of solids in the feed stream and the degree of fineness of the solids.

The underflow contains essentially all of the intact and fractured pigment glands of the feed slurry, relatively coarse (but smaller than 80 mesh) particles of meats many of which contain embedded pigment glands and hull particles. These solids range from 1 to 4 percent in gossypol content and from 44 to 59 percent in protein.

For embodiment 1 the underflow stream is removed from the system and filtered. While on the filter the cake is washed (with hexane) free of oil and is then routed to the desolventizer. For embodiment 2 the underflow stream is sent to another agitated tank where additional hexane is added and the resulting slurry is sent through a second 3-inch liquid cyclone to reclaim fines to enrich overall recovery and minimize the size of the filter needed for filtration of the underflow resulting from the second liquid cyclone. The resulting cake is washed with hexane on the filter to recover oil and the cake is then sent to a desolventization unit.

The overflow stream discharges from the upper, the vortex finder outlet, of the cyclone into an agitated filter feed tank. This overflow stream contains the extremely fine solids comprising the desired high protein, low gossypol portion of the feed stream.

Second Liquid Cyclone (Second Embodiment)

The underflow discharged from the first liquid cyclone is continuously pumped to an agitated receiving tank where additional hexane is metered in to reduce the solids content of the underflow slurry from 30–45 percent to 8–15 percent. It is obvious that the underflow from the first cyclone can be further disintegrated in a wet milling operation utillizing a stone mill prior to being directed to the receiving tank. This additional processing step will increase overall recovery of high-protein concentrate. The uniformly agitated slurry in the receiving tank is then fed to the second liquid cyclone at a pressure of at least 20 p.s.i. — and preferably at 40 p.s.i. The overflow from the second cyclone contaning about 1–15 percent solids and amounting to 50–90 percent of the feed is preferably returned to the in-line mixer to be utilized in place of hexane as a slurrying medium. The overflow from the second liquid cyclone may also be directed out of the system and recovered separately or combined with the overflow stream obtained from the first liquid cyclone in the first embodiment and recovered by filtration and desolventization.

The underflow from the second liquid cyclone contains about 30–45 percent solids and amounts to about 10–50 percent of the input feed stream to the second cyclone. This underflow is completely removed from the system, filtered, washed free of oil and desolventized.

Filtering

The overflow slurry from the first liquid cyclone containing approximately 14 percent edible high-protein solids are recovered from a totally enclosed rotary, vacuum, drum-type filter as a 35 to 40 percent solvent damp cake product. During filtration, the cake, about ⅛ to ¼ inch thick, is given a hexane displacement wash which effectively reduces its lipid content to below 1 percent. The solvent to cake ratio is 1.75 to 1. While operating at this low solvent wash ratio it was observed that the cake had a tendency to crack which resulted in channeling of the hexane wash and inefficient washing out of lipids. It was discovered that this tendency of the cake to crack could be overcome by the use of a slurry-feed wash of the cake as it emerged from the slurry tank. The wash is located approximately at the periphery of the horizontal axis of the drum. The cake produced has a solvent content of about 60 to 65 percent.

Desolventization

Desolventization is carried out in equipment designed to recover solvent with the use of heat. During desolventization the temperature of the cake is allowed to rise to 200°F in order to improve bacteria kill. Because of the low moisture content of the cake, this temperature has little to no effect on protein quality or product color.

Grinding

After heat treatment as above, the cake is ground through a sanitary stud mill to a fine flour and packaged. The final, edible, product flour has a protein content on the order of 65 percent or higher for both embodiments and a free gossypol content of 0.045 percent or less.

The data provided by Table I illustrates the typical values obtained in drying and comminution steps of the present invention.

The data provided in Table II illustrates the typical instantaneous material balance data obtained for the inline mixing and the single-cyclone operational steps. These are the values obtained in further processing the material of Table I.

The data provided in Table III illustrates the typical instantaneous material balance data obtained for the in-line mixing and the double-cyclone operational steps. These are the values obtained in further processing the material of Table I.

TABLE I

DRYING AND COMMINUTION EMBODIMENT 1 and 2

| | MEATS (COTTONSEED KERNELS) DRYING | | | | | | COMMINUTION OF DRIED MEATS | | |
|---|---|---|---|---|---|---|---|---|---|
| | Moisture[1] | | | Dryed Meats | | | Pin Disc Speed (RPM) | | |
| Feed Rate Lbs./Hr. | Before % | After % | Drying Temp. °F | Lbs./Hr. | Oil % | Solids Lbs./Hr[2] | Mill Side | Door Side | Feed Rate Lbs./Hr. |
| 283.9 | 6.3 | 1.5 | 180° | 270.0 | 33.0 | 180.9 | 9,500 | 2,500 | 1,360 |

[1] $H_2O$ Content
[2] Oil Free Basis

TABLE II

IN LINE MIXING AND SINGLE CYCLONE OPERATION AND RESULTS EMBODIMENT I

| | |
|---|---|
| Milled Dryed Meats LBS/Min. | 18.7 |
| Solids Content LBS/Min.[1] | 12.5 |
| Hexane Added LBS/Min. | 37.8 |
| Cyclone Feed Solids Content Percent[1] | 22.1 |
| Cyclone Slurry Feed Rate LBS/Min. | 56.5 |
| Cyclone Feed Pressure PSI | 40 |
| U F Pump Speed RPM[2] | 270 |
| U F Rate LBS/Min. | 15.7 |
| O F Rate LBS/Min.[2] | 40.8 |
| Split Ratio O F/U F | 2.6:1 |
| Solids in O F Percent[3] | 14.1 |
| Solids in UF Percent[3] | 42.7 |
| O F Solids Yield Percent[3] | 46.4 |
| O F Free Gossypol Percent[3] | .03 |
| O F Total Gossypol Percent[3] | .13 |
| O F Protein Percent[3] | 66.4 |

[1] Oil Free Basis
[2] O F = Overflow, U F = Underflow
[3] Solvent and Oil Free Basis

TABLE III

IN LINE MIXING AND TWO CYCLONE OPERATION AND RESULTS EMBODIMENT 2

| FIRST OR PRODUCT CYCLONE | |
|---|---|
| Milled Dryed Meats LBS/Min. | 15.1 |
| Solids Content LBS/Min.[1] | 10.1 |
| O F Slurry from second cyclone added LBS/Min[2] | 40.4 |
| O F Solids content percent[3] | 2.5 |
| Cyclone feed solids content percent[3] | 20.0 |
| Cyclone Slurry Feed Rate LBS/Min. | 55.5 |
| Feed Pressure PSI | 40 |
| U F Pump speed RPM[2] | 250 |
| U F Rate LBS/Min. | 12.8 |
| O F Rate LBA/Min. | 42.7 |
| Split Ratio O F/U F | 3.3:1 |
| Solids in O F Percent[3] | 12.5 |
| Solids in U F Percent[3] | 45.0 |
| O F Solids Yield Percent[3] | 52.5 |
| O F Free Gossypol Percent[3] | .04 |
| O F Total Gossypol Percent[3] | .14 |
| O F Protein Percent[3] | 65.2 |
| SECOND OR RECLAIMING CYCLONE | |
| U F Slurry From First Cyclone LBS/Min | 12.8 |
| U F Slurry Solids Content Percent[3] | 45.0 |
| Hexane added LBS | 40.0 |
| Cyclone feed solids content percent[3] | 10.9 |
| Cyclone feed rate LBS/Min | 52.8 |
| Feed Pressure PSI | 40 |
| U F Pump Speed RPM | 270 |
| U F Rate LBS/Min. | 12.4 |
| O F Rate LBS/Min. | 40.4 |
| Split Ratio O F/U F | 3.3:1 |
| Solids in O F Percent[3] | 2.5 |
| Solids in U F Percent[3] | 38.3 |

[1] Oil Free Basis
[2] O F = Overflow, U F = Underflow
[3] Solvent and Oil Free basis

We claim:

1. An improved process for producing an edible protein concentrate from cottonseed meats, the process comprising:

a. drying the cottonseed meats at a temperature of 180°F or less, to a moisture content of 2.5 percent or less, b. cooling the dried cottonseed meats to ambient temperature, c. comminuting (milling) the cooled meats in a wide chamber pin mill to prevent pigment gland and premature oil cell rupture, said pin mill having two contra-rotating discs of about 11 inches diameter, ¼ inch pins of cylindrical configuration, operating separately from the mill side at about 9500 rpm and from the door side at about 2500 rpm, d. adding a nonpolar hydrocarbon solvent to the milled meats and mixing thoroughly to produce a uniform slurry which contains about from 17 to 25 percent solids, by weight, e. feeding the uniform slurry into a liquid cyclone at a pressure of about from 35 to 45 pounds per square inch, said liquid cyclone being adjustable by inclusion of a variable speed positive displacement underflow pump, to produce an overflow to underflow stream ratio in the range of about from 1:1 to 1:9, respectively, said range being about from 10 to 15 percent solids content by weight with respect to overflow and about from 30 to 45 percent solids with respect to underflow, the said underflow stream containing the pigment gland-gossypol, large meal and hull particles, thus exiting the process for meal, oil, and solvent recovery, the overflow portion being retained for further processing, f. feeding the overflow stream portion as it emanates out of the upper outlet of the cyclone to a rotary vacuum filter where the miscella is separated from the solids, said solids thus forming a cake, and washing this cake with overflow feed slurry to prevent cake-cracking, thus obtaining sufficient oil removal in the following step, g. washing the cake further with non-polar solvent to obtain an essentially oil-free solvent-wet solid material with a solids content of about from 60 to 65 percent by weight, and h. removing the residual solvent from the solid material of step (g) by volatilizing at a temperature of about 200°F to produce a consistently edible flour product containing not more than 60 ppm of solvent and having a protein content of about 65 percent, a free gossypol content of 0.045 percent or less, an oil content of less than about 1 percent, and an overall recovery of initial solids of about 46 percent, all percentages being by weight.

2. The process of claim 1 wherein the wide chamber pin mill has two contra-rotating discs about 11 inches in diameter, ¼ inch pins of cyclindrical configuration, operating separately from the mill side at about 9500 rpm and from the door side at about 2500 rpm.

3. The process of claim 1 wherein the nonpolar hydrocarbon is hexane.

4. An improved process for producing an edible protein concentrate from cottonseed meats, the process comprising:
a. drying the cottonseed meats at a temperature of 180°F or less, to a moisture content of 2.5 percent or less,
b. cooling the dried cottonseed meats to ambient temperature,
c. comminuting (milling) the cooled meats in a wide chamber pin mill to prevent pigment gland and premature oil cell rupture, said pin mill having two contra-rotating discs of about 11 inches diameter, ¼ inch pins of cylindrical configuration, operating separately from the mill side at about 9500 rpm and from the door side at about 2500 rpm,
d. adding non-polar hydrocarbon solvent initially to the milled meats or alternately the overflow stream from step (f) once the process is on stream and mixing thoroughly to produce a uniform slurry which contains about 17 to 25 percent solids by weight,
e. feeding the uniform slurry into a liquid cyclone at a pressure of about from 35 to 45 pounds per square inch, said liquid cyclone being adjustable by inclusion of a variable speed positive displacement overflow pump, to produce an overflow to underflow stream ratio in the range of about from 1:1 to 1:9, respectively, said range being about from 10 to 15 percent solids content by weight with respect to overflow and about from 30 to 45 percent with respect to underflow, the said underflow stream containing the pigment gland-gossypol, large meal and hull particles, being retained for further processing in step (f) and the overflow portion being also retained in step (g),
f. adding fresh non-polar hydrocarbon solvent to the underflow steam obtained from step (e) to produce a uniform slurry which contains from 8 to 15 percent solids, said slurry being fed through a second liquid cyclone at a pressure of about 35 to 45 pounds per square inch, said liquid cyclone being adjustable by inclusion of a variable speed positive displacement underflow pump, to produce an overflow to underflow stream ratio in the range of about from 1:1 to 1:9, respectively, said range being about from 1 to 15 percent solids content by weight with respect to overflow and about from 30 to 45 percent with respect to underflow, the said underflow stream containing the pigment gland-gossypol, large meal and hull particles, thus exiting the process for meal, oil, and solvent recovery, the said overflow once on stream being used to produce the slurry of step (d), which is the feed to the first cyclone,
g. feeding the overflow portion emanating from step (e) to a rotary vacuum filter where the miscella is separated from the solids, said solids thus forming a cake and washing this cake with overflow feed slurry to prevent cake cracking, thus obtaining efficient oil removal in the following step,
h. washing the cake further with non-polar solvent to obtain an essentially oil-free solvent-wet solid material with a solids content of about from 60 to 65 percent by weight, and
i. removing the residual solvent from the solid material of step (g) by volatilizing at a temperature of about 200°F, to produce a consistently edible flour product contaning not more than 60 ppm of solvent and having a protein content of about 65 percent, a free gossypol content of 0.045 percent or less, an oil content of less than about 1 percent, and an overall recovery of initial solids of about at least 50 percent, all percentages being by weight.

5. The process of claim 4 wherein the wide chamber pin mill has 2 contra-rotating discs about 11 inches in diameter, ¼ inch pins of cylindrical configuration, operating separately from the mill side at about 9500 rpm and from the door side at about 2500 rpm.

6. The process of claim 4 wherein the non-polar hydrocarbon is hexane.

* * * * *